Feb. 28, 1967    A. A. SODERBERG    3,305,888
BRISTLE CUTTING TOOL
Filed May 10, 1965
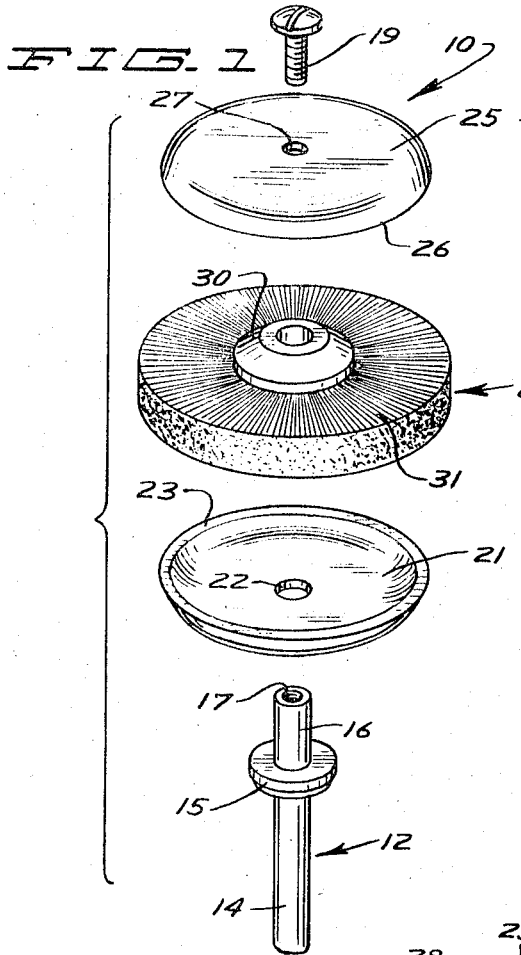
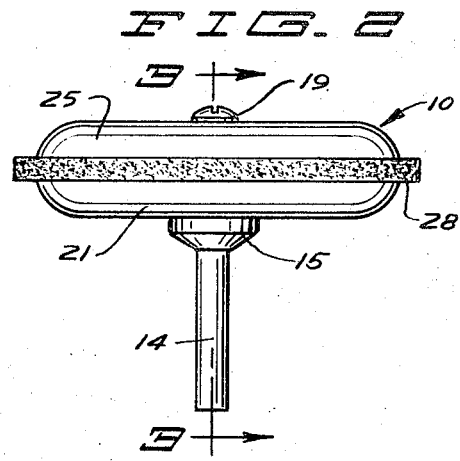
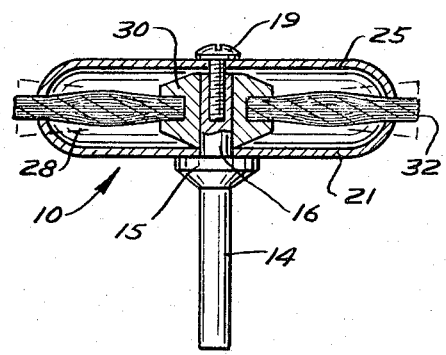
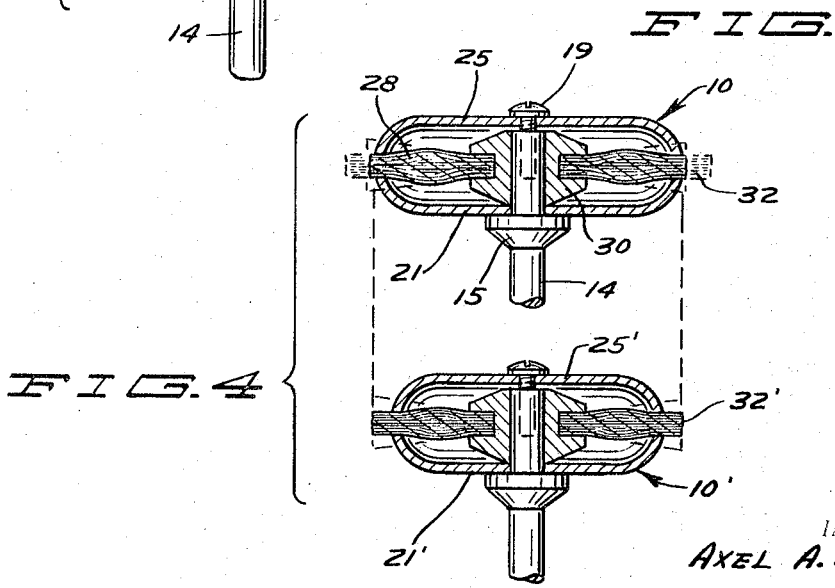
INVENTOR.
AXEL A. SODERBERG
BY
Reif and Gregory
ATTORNEYS

3,305,888
BRISTLE CUTTING TOOL
Axel A. Soderberg, 3534 Morgan Ave. N.,
Minneapolis, Minn. 55412
Filed May 10, 1965, Ser. No. 454,578
1 Claim. (Cl. 15—179)

This invention relates to an improvement in a cutting tool. More particularly this invention relates to a powered cutting tool such as is used in a dental laboratory for all purpose cutting in working on pieces such as molds, dentures, and the like.

Conventional cutting tools on the order of burrs and emery wheels tend to have their cutting edges or cutting surfaces become clogged or coated with cuttings.

It is an object of this invention to provide a cutting tool which will have its cutting edge or cutting surface free from becoming clogged or coated with cuttings.

It is another object of this invention to provide a cutting tool comprising an arbor, clamping means mounted on said arbor, and a circular brush carried between said clamping means, said brush having a free peripheral portion of short length about said clamping means, and said clamping means compacting said free peripheral edge portion to form a relatively rigid cutting edge portion thereof.

These and other objects and advantages of the invention will be set forth in the following description made in connection with the accompanying drawings in which like reference characters refer to similar parts throughout the several views and in which:

FIG. 1 is an exploded view in perspective showing the various parts of the invention herein;

FIG. 2 is a view in side elevation;

FIG. 3 is a view in vertical section taken on line 3—3 of FIG. 2 as indicated; and FIG. 4 is a composite view in vertical section showing the use of alternate elements with some portions being broken away.

Referring to the drawings, the cutting tool comprising the invention herein is indicated generally by the numeral 10.

Said cutting tool consists of an arbor 12 of a conventional design. Said arbor will be held for operation in the chuck of a hand tool.

Said arbor 12 comprises a spindle 14 having an annular supporting shoulder 15 about an upper portion thereof and having an extension 16 of said spindle thereabove. Said extension of said spindle has an axial tap 17 therein to receive a locking member 19 shown here in the form of a bolt.

Adapted to be disposed onto said extension and seated on said shoulder 15 is a dish shaped plate like member 21 forming a circular clamping member having a central aperture 22 to receive said extension therethrough. Said clamping member has an upturned peripheral or rim portion 23.

A mating dish shaped clamping member 25 is superposed on said clamping member 21 having a depending rim portion 26 which is a mirror image of said rim portion 23. Said clamping member 25 is seated upon the extension 16 and has a central aperture 27 to receive said hold down or clamping screw 19 therethrough.

Disposed between said clamping members 21 and 25 is a cutting member in the form of a wire bristle brush 28. Said brush comprises an apertured hub portion 30 to receive said extension 16 therethrough. Extending radially outwardly of said hub portion normal to the axis thereof are a multiplicity of bristles 31. Said bristles are relatively flexible and are present in sufficient quantity to provide said brush with a substantially thick layer of bristles. Said brush in its natural state has suitability as a burnishing tool but has no utility as a cutting member. The bristles are relatively long, become brittle with use and break off at the hub portion. The diameter of the brush will be relative to the diameters of the clamping members 21 and 25.

A commonly used size of such a tool as here described will have clamping members having diameters on the order of 2¼ inches and the brush will have a diameter on the order of ¼ inch greater. It is this diameter of ¼ inch which represents a free or extended peripheral edge portion 32 of said brush.

The bolt 19 will press the clamping member 25 against the clamping member 21 and the approaching rim portions of said clamping members engage, compress and compact the bristles of said brush therebetween at the line of engagement. As a result, the extended peripheral portion 32 of said brush becomes compacted to form a rigid and effective cutting edge. With reference to FIG. 3, it has been found in practice that a brush having a natural bristle thickness of ½ inch, if compacted as described to form a peripheral edge having a thickness of ³⁄₁₆ inches, that a very effective cutting edge results. Brushes having bristle portions of various thicknesses may be compacted proportionately.

The bristle portions making up the free peripheral edge portion will be sufficiently rigid and compacted to form an effective cutting edge and yet will retain sufficient flexibility to be self cleaning and to avoid becoming clogged or coated with cuttings. Said brush 28 as adapted and arranged between said clamping members 21 and 25 has been found to form a very effective all purpose cutting tool.

The extension 16 of said arbor will have a length sufficiently less than the combined thickness of the top wall of said clamping member 21 and of the hub of said brush 28 to provide for the degree of compacting effect indicated. The degree of compacting indicated has been found to provide sufficient clamping pressure upon the bristles of the brush to prevent independent rotation of the brush. There may be provided sufficient leeway to vary to some extent the degree of pressure exerted upon the bristles 31.

It is obvious that the extended peripheral edge portion of said brush 28 will wear down with use. To adapt the tool in view of this condition, a series of clamping members will be provided to accommodate the diminution in the diametrical dimension of said brush 28 resulting from wear. Thus with reference to FIG. 4, clamping members 21' and 25' are provided by way of example which are sufficiently less in diameter than said members 21 and 25 whereby with their use a new extended peripheral edge portion is provided. By a continued exchange or change over of successively smaller clamping members, the brush may be utilized until its bristles are virtually worn down to its hub.

Thus with reference to the composite FIG. 4, the tool 10 is shown with its worn peripheral edge portion 32 indicated by the dotted area. The lower tool 10' has been provided with smaller clamping plates 21' and 25' to form a new peripheral edge portion 32'.

The assembly of the cutting tool herein is believed to be fairly obvious from the description given.

From the foregoing it is seen that I have provided a simply constructed and very effective all purpose cutting tool. This tool has proved to be very successful in commercial use.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

A cutting tool of the class described having in combination,
- a spindle,
- an annular shoulder about said spindle,
- a portion of said spindle extending above said shoulder,
- an axial tap within said extended spindle portion,
- a circular brush comprising an apertured hub and radially extending bristles,
- a clamping member comprising
- a pair of facing dish-shaped members respectively having peripheral portions curved to extend towards one another and having mating peripheral edge portions,
- one of said facing members being seated on said spindle supported by said shoulder and having a central aperture to receive said spindle,
- the other of said facing members overlying said spindle and having an aperture therein in register with said axial tap,
- said brush being disposed on said spindle between said facing members and having its bristles adjacent the outer edge portions thereof clamped between said mating peripheral edge portions of said members,
- the axial distance between said facing members with said bristles being disposed between their peripheral edge portions being somewhat greater than the length of said extended portion of said spindle, and
- a screw threaded into said axial tap through the other of said facing members causing said facing members to bear against one another and clamp said bristles under tension.

References Cited by the Examiner

UNITED STATES PATENTS

| | | | |
|---|---|---|---|
| 285,222 | 9/1883 | Brunelle | 15—198 |
| 317,800 | 5/1885 | Knipe | 15—179 |
| 565,218 | 8/1896 | Rendel | 15—179 |
| 612,157 | 10/1898 | Cook | 15—179 |
| 649,289 | 5/1900 | Farnham | 15—181 |
| 863,790 | 8/1907 | Dixon | 15—179 |

FOREIGN PATENTS 174,826    9/1906    Germany.

CHARLES A. WILLMUTH, *Primary Examiner.*

PETER FELDMAN, *Assistant Examiner.*